United States Patent [19]  
Keilmann

[11] Patent Number: 4,994,818  
[45] Date of Patent: Feb. 19, 1991

[54] SCANNING TIP FOR OPTICAL RADIATION

[75] Inventor: Fritz Keilmann, Stuttgart, Fed. Rep. of Germany

[73] Assignee: Max Planck-Gesellschaft zur Foerderung der Wissenschaften e.V., Fed. Rep. of Germany

[21] Appl. No.: 428,213

[22] Filed: Oct. 27, 1989

[30] Foreign Application Priority Data

Nov. 3, 1988 [DE] Fed. Rep. of Germany ....... 3837389

[51] Int. Cl.$^5$ ............................................. H01Q 13/00
[52] U.S. Cl. ..................................... 343/786; 343/785
[58] Field of Search ................ 343/786, 785, 762, 772

[56] References Cited

U.S. PATENT DOCUMENTS

| | | | |
|---|---|---|---|
| 2,307,011 | 1/1943 | Barrow | 343/786 |
| 2,548,821 | 4/1951 | Riblet et al. | 343/786 |
| 2,685,068 | 7/1954 | Goubau | 343/785 |
| 3,588,754 | 6/1971 | Hafner | 343/785 |
| 4,528,528 | 7/1985 | Augustin | 343/786 |

OTHER PUBLICATIONS

E. A. Ash et al., Nature vol. 237, Jun 30, 1972, pp. 510–512.
Optical Stethoscopy: Image Recording with Resolution, D. W. Pohl, W. Denk and M. Lanz–Apr. 1, 1984, pp. 651–653.

Primary Examiner—Rolf Hille
Assistant Examiner—Hoanganh Le
Attorney, Agent, or Firm—Handal & Morofsky

[57] ABSTRACT

Scanning tip for electromagnetic radiation having wavelengths below about 3 cm comprising a waveguide (10) which acts as high-frequency hollow waveguide and which comprises a wall (12) of an electrically conductive material and the internal cross-section of which diminishes from a point at which it has a magnitude which permits unrestricted propagation of the radiation perpendicularly to the cross-sectioin to an end aperture (14) having a dimension (s) which is small in comparison with the wavelength of the radiation, having a rod (20) which comprises an electrically conductive surface which is electrically insulated with respect to an electrically conductive inner wall of the hollow waveguide and extends from the aperture (14) at least up to said location (z=0).

21 Claims, 3 Drawing Sheets

4,994,818

SCANNING TIP FOR OPTICAL RADIATION

FIELD OF THE INVENTION

The present invention relates to scanning tips or optical stethoscopes for so-called optical electromagnetic radiation.

DESCRIPTION OF THE RELATED ART

In microscopy with visible light the minimum spatial resolution is of the order of magnitude of the wavelength of the light used. This limit is due to diffraction. If the principle of the optical microscope is applied to wavelengths of infrared to the microwave range then due to the larger wavelengths compared with visible light a correspondingly smaller spatial resolution results. A resolution of about 1 μm as needed for investigating planar integrated circuits can then no longer be achieved. On the other hand, a microscopic measuring technique with optical radiation in the microwave to the infrared range, i.e. in the wavelength range from about 1 μm to about 3 cm, is extremely interesting because all materials have specific resonance regions in this range. In principle it is therefore possible to find for each material type or state a wavelength giving optimum observation contrast.

It is known from the publication by Pohl et al., Appl. Phys. Lett., 44 (7), Apr. 1, 1984, 651–653, to scan a structure to be investigated by means of an optical scanning tip ("optical stethoscope") which has an effective aperture which is substantially smaller than the wavelength of the radiation used. The scanning tip consists of a quartz rod having a conically tapering pointed end with a radius of curvature of about 30 nm. The side walls of the quartz rod are coated with a metal layer. When the pointed end is pressed onto a hard surface, at said pointed end a hole is formed having a diameter which is small compared with the wavelength (488 nm) of the optical radiation used. The quartz rod reflects the light at side walls and the front end of the metal layer with the hole squeezed therein forms a sort of aperture.

It is known from a publication by Ash et al., Nature, 237, June 30, 1972, 510–512, to couple microwave radiation having a frequency of about 10 GHz into a cavity resonator which in one wall has a hole with a diameter of 1.5 mm. The object to be investigated is scanned with the radiation emerging from said hole and a spatial resolution of about 1/60 of the wavelength can be achieved. A disadvantage of this "resonance method" is that the cavity resonator has a very narrow band width and can be used practically only for a quite specific wavelength.

A disadvantage of the first arrangement mentioned and operating with a tapering quartz rod waveguide is that a great part of the radiation is reflected and thus does not contribute to the useful radiation leaving the aperture.

SUMMARY OF THE INVENTION

It is an object of the invention to provide a scanning tip in which the transmission of optical radiation between a region of large cross-section permitting a substantially unrestricted propagation of the radiation and an end aperture small compared with the wavelength of the radiation is improved.

According to an embodiment of the invention a scanning tip is provided for electromagnetic radiation with wavelengths under about 3 cm, e.g. under about 1 mm, comprising a waveguide which has a wall of an electrically conductive material and the internal cross-section of which diminishes from a point at which it has a magnitude which permits unrestricted propagation of the radiation perpendicularly to the cross-section to an end aperture having a dimension (s) which is small in comparison with wavelength of the radiation, wherein the cross-sectional dimension at a location (z=0) between said point and that of the end aperture assumes a value corresponding to the limit wavelength at which a reflection of the radiation fed in from said point occurs, and the end aperture is arranged at a predetermined distance (d) from said location and in the waveguide a rod is arranged which has an electrically conductive surface and extends from the aperture at least up to said location (z=0).

By providing a rod which has an electrically conductive surface insulated with respect to the walls of the waveguide section and extends into the waveguide section up to a point at which the cross-section permits a substantially unrestricted propagation of the radiation said region becomes a sort of coaxial line along which due to the now changed field distribution radiation of relatively long wavelength can also be propagated.

In the scanning tip according to the invention the transmission efficiency in the direction from the region of large cross-section to the small end aperture and viceversa is substantially better than in the aforementioned known scanning tip. The scanning tip according to the invention moreover has a wide frequency band width and can therefore be employed with optimum efficiency for a whole spectrum of wavelengths. The preferred area of use is the wavelength range below about 3 cm, in particular the microwave and far-infrared range, possibly also the region of the near infrared and visible light and ultraviolet, as long as metals can act as radiation guide medium.

The present scanning tip can be used for a great variety of purposes, for example raster microscopy and microscopic spectroscopy, and in both of them can be employed both in transmission as well as in reflection and emission; further uses are for nonlinear spectroscopy, stimulation, stimulation of semiconductor electrons, radiation heating, short-time spectroscopy, this all being possible with high spatial resolution.

BRIEF DESCRIPTION OF THE DRAWINGS

Hereinafter preferred examples of embodiment of the invention will be explained in detail with reference to the drawings, wherein.

DESCRIPTION OF THE PREFERRED EMBODIMENT

Figure 1:
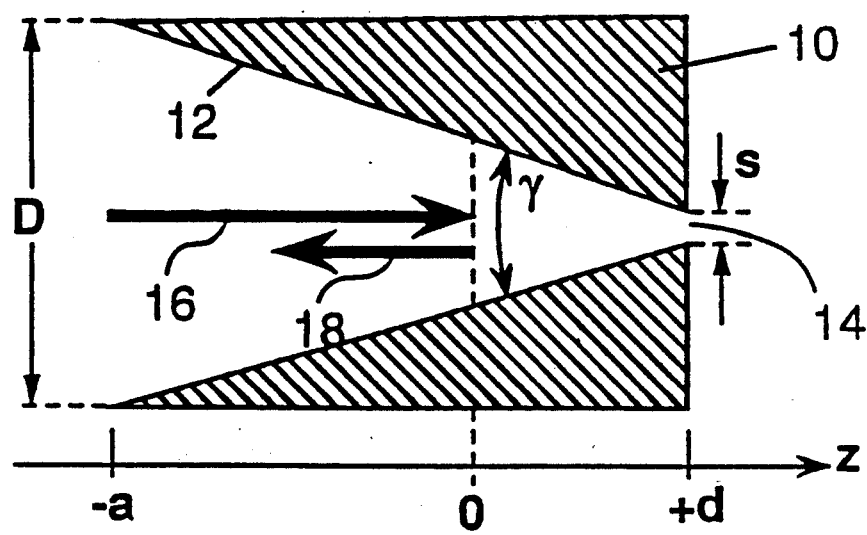
FIG. 1 is a cross-sectional view of a scanning tip with reference to which the problem underlying the invention will be explained and FIG. 2 is a cross-sectional view of a preferred embodiment of the invention.

FIG. 1 illustrates a waveguide in the form of a hollow waveguide segment 10 which consists at least at its inner wall 12 of a material having the best possible electrical conductivity, for example a metal, such as aluminium or silver. The internal cross-section of the hollow waveguide segment 10 decreases continuously along an axial or radiation propagation direction z from a point $z=-a$ to an end aperture 14 at $z=+d$, the decrease preferably being linear. In the region $z<0$ the internal cross-section is large enough to permit a substantially unrestricted propagation of the radiation in the hollow waveguide segment operating like a high-frequency conductor.

Tapered metallic hollow waveguides are also already known for electromagnetic radiation in the microwave and far infrared range. They may be used for concentration or "focusing" of the radiation down to dimensions of about half a wavelength. The smallest possible dimensions of the internal cross-section of the hollow waveguide are governed by the critical wavelength or limit wavelength. With square cross-section the minimum possible side length of the hollow waveguide cross-section, i.e. also an exit aperture for the focused radiation, is equal to half the wavelength. For if the cross-section is made smaller the blocking region is reached, the wave can no longer be propagated in the region with the smaller cross-section and is therefore totally reflected at the critical point. However, the reflection of the radiation does not occur abruptly at the critical point of the hollow waveguide, which is to be denoted by $z=0$, z being the axial or radiation propagation direction in the hollow waveguide. For part of the radiation leaks into the blocking region $z>0$. Its intensity decreases from $z=0$ over-exponentially with increasing z. The effect of the leakage radiation can be utilized if d is chosen so that at the location of the aperture 14 leakage radiation power is available.

Figure 2:
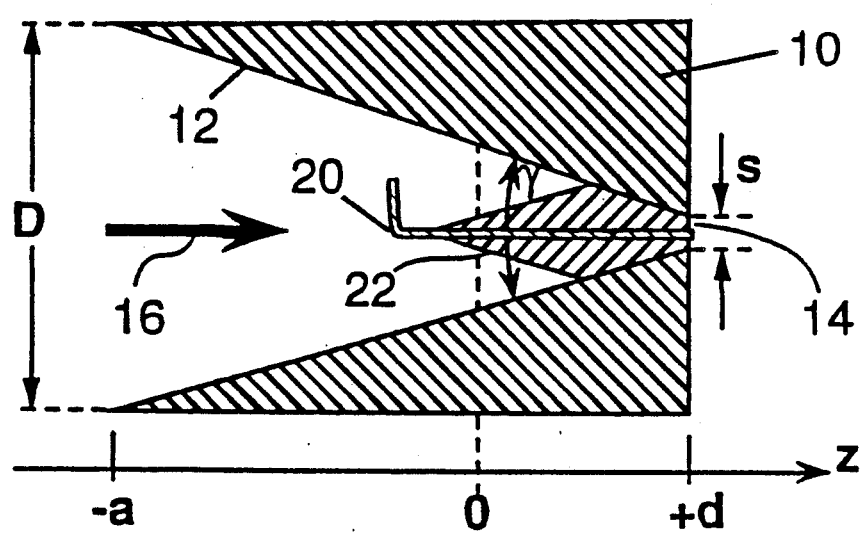
Figure 3:
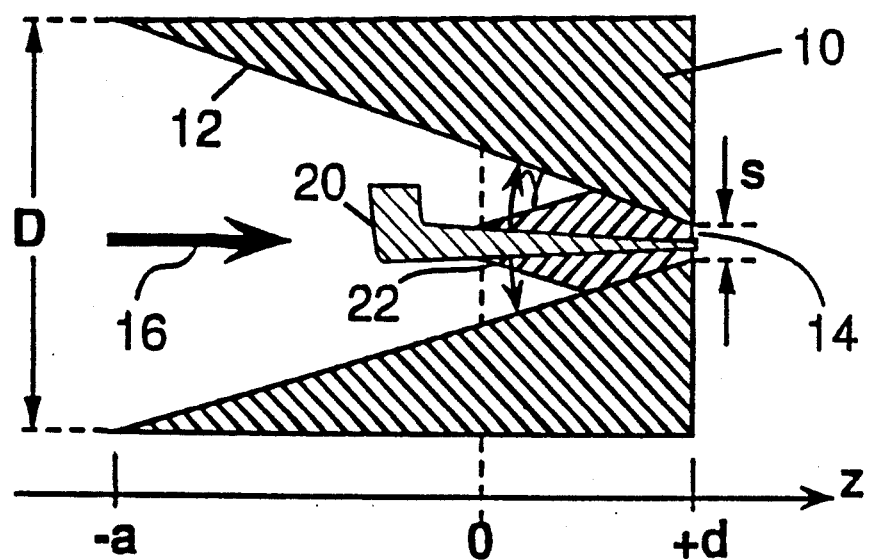
FIG. 3 is a cross-sectional view of a preferred embodiment of the invention with a tapered rod.

Even if the distance d is only a few wavelengths, in the scanning tip illustrated in FIG. 1 the radiation power available at the aperture 14 is substantially less than the radiation power radiated in at $z=-a$ because it is after all only leakage radiation. This disadvantage is avoided in the embodiment according to FIG. 2. The embodiment according to FIG. 2 contains a hollow waveguide segment 10 having a tapering circular internal cross-section. However, in this case a coaxial rod 20 is additionally provided and extends from the centre of the aperture 14 through the blocking region $z>0$ into the region $z<0$ in which an unobstructed propagation of the radiation is possible. The rod 20 has a circular cross-section and a highly conductive surface and may consist for example of a metal such as silver or aluminium. It is electrically insulated with respect to the inner wall 12 and held by a for example double-cone-shaped body of low-loss dielectric. A suitable dielectric is for example polyethylene which absorbs very little in the infrared and microwave range and has an almost constant refractive index. For the mounting a short plug may also be used in the aperture and/or a disc in the hollow waveguide segment.

The region containing the rod 20 represents a coaxial line along which longwave radiation can also be propagated because of the now different field distribution. By using a tapered metallic high-frequency coaxial line at least in the blocking region a focusing scanning tip is obtained which in principle transmits the power 16 radiated in without loss to the aperture 14.

In practice it is expedient to make the coaxial line portion free from reflection. This can be done with means known in microwave technology. In particular, a rod 20 may be used which conically tapers in the direction towards the aperture 14 in such a manner that the ratio of internal diameter to external diameter of the coaxial line along z is constant. If a dielectric holding body 22 is used which takes up an appreciable volume in the hollow waveguide the dielectric must be taken into account in the usual manner.

The rod 20 expediently extends somewhat into the region $z<0$ and acts there as antenna. It may be bent there in the direction of the electric field. As for the coaxial line, wide-band behaviour may also be achieved for the antenna.

The radiation can be focused by a lens into the wide end of the scanning tip. The value of d depends somewhat on the tapering angle $\tau$ (FIG. 1) and for a tapering angle of 30 degrees may be about one wavelength and for a tapering angle of 10 degrees about 3 wavelengths.

Hitherto coaxial lines have not been used for the frequency range above about 30 GHz, no doubt because of the high losses resulting from absorption in the dielectric and also from reflection at cable connectors. With the present scanning tip the absorption losses are acceptable because the line length is unusually short, i.e. of the order of magnitude of a few wavelengths.

The present state of micromechanical production permits tips with $s=1$ $\mu$m and consequently for microwaves with a wavelength of 1 cm a focusing to 1/10000 of the wavelength can be achieved.

The hollow waveguide 10 may also have a rectangular, square or elliptic cross-section. For production reasons the circular cross-section is preferred. When reference is made here to the cross-section dimension of the hollow waveguide, for example the dimension D at the point $z=-a$ or the dimension s of the aperture 14, this means the diameter in a hollow waveguide with circular cross-section and the maximum cross-section dimension in a hollow waveguide with non-circular cross-section. The rod preferably has a cross-sectional form similar to the waveguide but this is however not necessary.

When using the hollow waveguide segment 10 for scanning microscopy (see the publication of Pohl, loc. cit.), the object to be investigated should be arranged at a distance in front of the aperture which is not greater than about s/2 in order to obtain optimum resolution (substantially equal to s).

In an embodiment for radiation with a wavelength of 500 $\mu$m, s was made equal to 5 $\mu$m. The hollow waveguide and the coaxial line section were circular-symmetrical.

I claim:

1. A scanning tip for electromagnetic radiation with wavelengths under about 3 cm, comprising a hollow waveguide which has a surface of an electrically conductive material, said surface defining an internal volume, the transverse cross-section of said volume tapering from a first region at which said cross-section is dimensioned to have a magnitude which permits substantially unrestricted propagation of said electromagnetic radiation perpendicularly to said transverse cross-section toward an end aperture, said end aperture having a dimension (s) which is smaller than the dimension of said first region and small in comparison to the wavelength of said electromagnetic radiation, wherein said hollow waveguide, at a location ($z=0$), said location being between said first region and said end aperture, defines a cross-section having a dimension with respect to the wavelength which results in substantial refection of said electromagnetic radiation, propagated from said first region occurs and said end aperture is positioned in the volume defined by said waveguide and at a predetermined distance (d) said predetermined distance being a few wavelengths of said electromagnetic radiation in length from said location, and a rod insulated from said surface having an electrically conductive surface and extending from said end aperture at least up to said location (z=0).

2. A scanning tip according to claim 1, wherein said rod extends from said end aperture beyond said location into said region of the hollow waveguide wherein said cross-section is configured and dimensioned to permit a substantially unrestricted propagation of said electromagnetic radiation.

3. A scanning tip according to claim 2, wherein the section of said rod extending beyond said location is configured, dimensioned and positioned to act as an antenna.

4. A scanning tip according to claim 3, wherein said rod is bent in the direction of an electric field generated by said electromagnetic radiation in said hollow waveguide.

5. A scanning tip according to claim 1, wherein the rod is held by at least one dielectric body.

6. A scanning tip according to claim 1, wherein the cross-section of said rod decreases in the direction towards said end aperture from said location.

7. A scanning tip according to claim 1, wherein said hollow waveguide has a circular cross-section.

8. A scanning tip as claimed in claim 1, wherein the distance between said location and said end aperture is 1 to 3 wavelengths of said electromagnetic radiation.

9. A scanning tip as claimed in claim 1, wherein said cross-section diminishes at a constant rate.

10. A scanning tip as claimed in claim 9, wherein said constant rate corresponding to a tapering angle of 10 to 30 degrees.

11. A scanning tip as claimed in claim 1, wherein said electromagnetic radiation defines wavelengths under 1 mm.

12. A scanning device using electromagnetic radiation of frequencies above 30 GHz, comprising:
(a) a hollow waveguide, comprising:
  (i) an electrically conductive surface defining an interior conic-section volume, said surface configured and dimensioned to define:
    (A) a radiation source end having radiation source end cross-section of sufficient size to allow unrestricted propagation of said electromagnetic radiation substantially perpendicular to said radiation source and cross-section;
    (B) a scanning aperture having a scanning aperture cross-section with dimensions small in comparison with the wavelength of said electromagnetic radiation, said surface tapering from said radiation source cross-section to said scanning aperture; and
    (C) a critical cross-section between said radiation source cross-section and said scanning aperture, said critical cross section spaced a few wavelengths from said aperture and said critical cross-section dimensioned to correspond to the critical wavelength dimension for refection of said electromagnetic radiation in said hollow waveguide; and
(b) a rod, comprising an electrically conducting surface, configured, dimensioned and positioned to extend within said interior conic-section volume from said scanning aperture to at least said critical cross-section, said rod electrically insulated from said electrically conductive surface.

13. A scanning device as claimed in claim 12, wherein said rod extends from said scanning aperture to beyond said critical cross-section, and said rod being positioned to act as an antenna.

14. A scanning device as claimed in claim 13, wherein said rod is bent in the direction of an electric field generated by said electromagnetic radiation in said hollow waveguide.

15. A scanning device as claimed in claim 12, wherein the cross-section of said rod decreases in the direction towards said scanning aperture from said critical cross-section.

16. A scanning device as claimed in claim 12, wherein said hollow waveguide has a circular cross-section.

17. A scanning device as claimed in claim 12, wherein the distance between said critical cross-section and said scanning aperture is 1 to 3 wavelengths of said electromagnetic radiation.

18. A scanning device as claimed in claim 12, wherein said wall tapers from said radiation source cross-section to said aperture at a constant rate.

19. A method of scanning an object comprising the steps of:
(a) focusing radiation above 30 GHz towards a wide end of an internally tapering scanning electrically conductive tip;
(b) propagating said radiation in a substantially unrestricted manner into said wide end of said scanning tip to a position in said tip where said scanning tip tapers internally to a critical wave dimension that corresponds to a point of substantial reflection for said radiation in said scanning tip;
(c) propagating said radiation from said point of substantial reflection for a distance of a few wavelengths of said radiation to an aperture having a cross-section with a dimension small compared to a wavelength of said radiation in said scanning tip by means of a coaxial line; and
(d) propagating said radiation from said aperture for a distance not greater than half said aperture dimension to said object to be scanned.

20. A method for scanning electromagnetic radiation with wavelengths under about three centimeters, comprising passing radiation into a hollow waveguide which has a surface of an electrically conductive material, said radiation being passed through an internal volume defined by said surface, the transverse cross-section of said volume tapering from a first region where said radiation is introduced and at which said cross-section is dimensioned to have a magnitude which permits substantially unrestricted propagation of said electromagnetic radiation perpendicularly to said transverse cross-section toward and end aperture, said end aperture having a dimension which is smaller than the dimension of said first region and small in comparison to the wavelength of said electromagnetic radiation, wherein said hollow waveguide, at a location (z=0), said location being between said first region and said end aperture, defines a cross-section having a dimension corresponding to the wavelength of said electromagnetic radiation being the critical wavelength at which substantial reflection of said electromagnetic radiation, propagated from said first region occurs, and propagating radiation to said end aperture, positioning a rod in the volume defined by said waveguide and insulated from said surface, said rod extending between the aperture and the location a predetermined distance (d), said predetermined distance extending a few wavelengths of said electromagnetic radiation in length from said location, and extending from said end aperture at least up to said location (z=0).

21. A method as in claim 20, wherein the distance between said end aperture and an object to be scanned is small in comparison to the wavelength of said electromagnetic radiation.

* * * * *